United States Patent [19]
Waelput et al.

[11] Patent Number: 5,467,746
[45] Date of Patent: Nov. 21, 1995

[54] ADAPTERS FOR FLUSHING AN INTERNAL COMBUSTION ENGINE

[76] Inventors: Erik F. M. Waelput, 6530 Sattes Dr., Rancho Palos Verdes, Calif. 90274; Peter C. Hollub, 16615 S. Pacific, Sunset Beach, Calif. 90742; Joseph D. Lentini, 311 Easter Cir., Huntington Beach, Calif. 92649

[21] Appl. No.: 173,088

[22] Filed: Dec. 27, 1993

[51] Int. Cl.⁶ ..................................................... F01M 11/04
[52] U.S. Cl. ......................................... 123/196 A; 184/1.5
[58] Field of Search ........................... 123/196 R, 196 A, 123/196 S; 184/1.5

[56] References Cited

U.S. PATENT DOCUMENTS

| | | |
|---|---|---|
| 1,549,952 | 8/1925 | Anderson . |
| 1,696,100 | 12/1928 | Osborne . |
| 1,751,053 | 3/1930 | Osborne . |
| 2,366,073 | 12/1944 | Vallerie . |
| 2,454,585 | 11/1948 | Alderman . |
| 2,493,120 | 1/1950 | Eaton . |
| 2,525,978 | 10/1950 | Vallerie . |
| 2,665,772 | 1/1954 | Greer et al. . |
| 2,896,645 | 7/1959 | Iwasaki . |
| 3,029,898 | 4/1962 | Fraser . |
| 3,103,947 | 9/1963 | Mueller ..................................... 184/1.5 |
| 3,431,145 | 3/1969 | Riley . |
| 3,489,245 | 1/1970 | Broadwell . |
| 4,140,543 | 2/1979 | Soleri et al. . |
| 4,613,014 | 9/1986 | Millet ....................................... 184/1.5 |
| 4,709,722 | 12/1987 | Knapp ...................................... 184/1.5 |
| 4,776,430 | 10/1988 | Rule ......................................... 184/1.5 |
| 4,787,348 | 11/1988 | Taylor . |
| 4,909,207 | 3/1990 | Takano et al. . |
| 4,964,373 | 11/1990 | Bedi . |
| 4,976,233 | 12/1990 | Bedi et al. ........................... 123/196 R |
| 4,991,608 | 2/1991 | Schweiger . |
| 5,044,334 | 9/1991 | Bedi ..................................... 123/196 R |
| 5,048,578 | 9/1991 | Dorf et al. ............................... 141/346 |
| 5,063,896 | 11/1991 | Hyatt et al. . |
| 5,094,201 | 3/1992 | Bedi ..................................... 123/196 R |
| 5,154,775 | 10/1992 | Bedi ......................................... 184/1.5 |
| 5,168,844 | 12/1992 | Waelput .............................. 123/196 R |
| 5,232,513 | 8/1993 | Suratt et al. . |

FOREIGN PATENT DOCUMENTS

| | | |
|---|---|---|
| 941932 | 9/1948 | France . |
| 211338 | 2/1967 | Sweden . |

Primary Examiner—Henry C. Yuen
Assistant Examiner—Erick Solis
Attorney, Agent, or Firm—Merchant, Gould, Smith, Edell, Welter & Schmidt

[57] ABSTRACT

An adapter system for use with an internal combustion engine flushing apparatus which permits connection to the crank case and the oil filter of internal combustion engines. A first adapter enables a conduit hose of a flushing apparatus to be connected with the drain plug port of an oil pan of the engine. In one form this first adapter fits within the drain plug port of internal combustion engines and a connector and upwardly directed hose are attached to the adapter. This adapter is intended to be permanently in place. In another form of the drain port adapter, the construction is relatively slim in overall depth thereby to facilitate location in awkward positions. An oil filter adapter includes adapter cap with an elongated threaded post which fits at the oil filter port leading to the oil filter adapter of the internal combustion engine. The cap for the adapter is connected to the post. The post is surrounded by a cylindrical ring which is part of the oil filter construction of the engine. A second conduit from the flushing apparatus can be connected to the vehicle engine so that a flushing solution in the apparatus can be circulated through and clean the internal combustion engine.

16 Claims, 5 Drawing Sheets

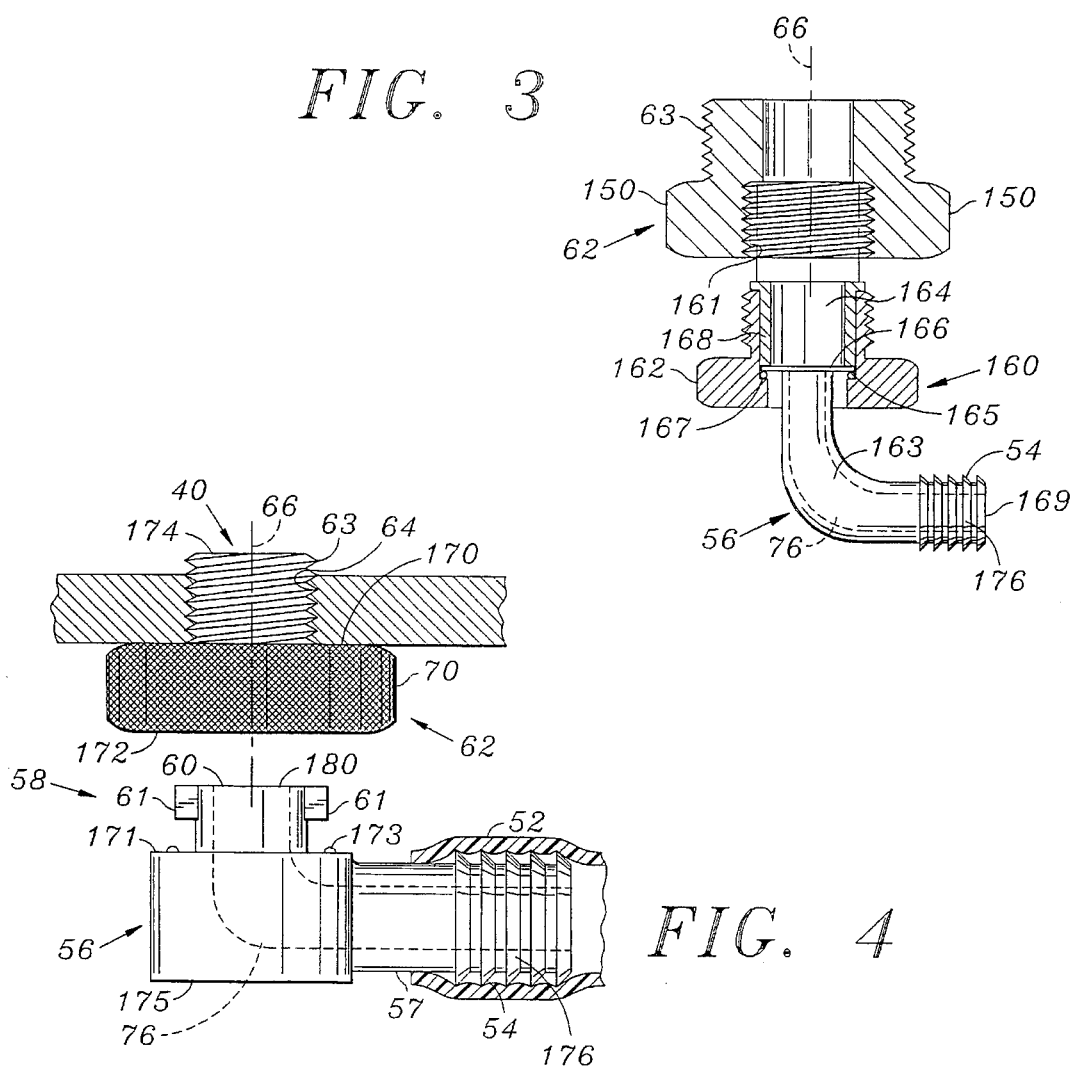
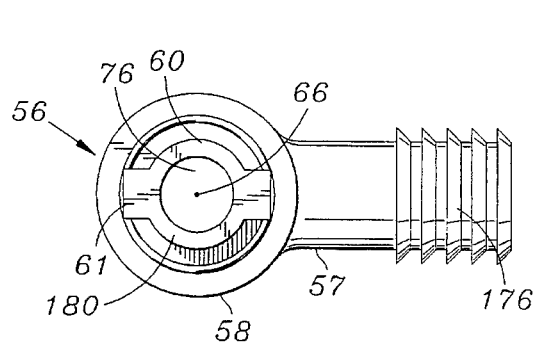
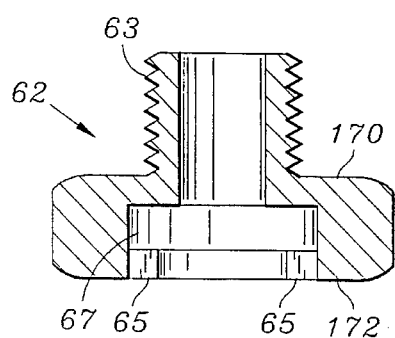

ADAPTERS FOR FLUSHING AN INTERNAL COMBUSTION ENGINE

RELATED APPLICATIONS

This invention relates to Ser. No. 07/969,387 filed Oct. 30, 1992 entitled SYSTEM FOR CLEANING INTERNAL COMBUSTION ENGINES, now U.S. Pat. No. 5,383,481. The contents of these applications are incorporated by reference herein.

BACKGROUND

Effectively cleaning internal areas of heavy duty internal combustion engines is valuable.

This invention relates to engine cleaning and flushing internal parts of an internal combustion engine. More particularly, the invention is concerned with adapter for use with cleaning and flushing apparatus. Such adapters are to enable connection to the oil drain port and an oil filter port.

Many foreign particles are suspended within the oil of internal combustion engines. These particles are removed by the filter of the internal combustion engine or otherwise removed when the oil is periodically drained for replacement by new oil. However, it is recognized that many of these foreign particles are not removed by the filter system or by the periodic changing of the lubricating oil. As a result, foreign particles accumulate within the internal combustion engine and can ultimately lead to premature wear if not damage to the engine.

As a result of some of the drawbacks of the filter system and periodic oil changes, it has been recognized that a flushing apparatus can be used for removing some of the foreign particles which accumulate, particularly within the crank case of an internal combustion engine. With this flushing apparatus, a conduit is connected to the drain plug port at the oil pan of the engine. Another conduit is connected to the oil filter port leading to the oil filter adapter of the engine. These two conduits are maintained in a series circulation pattern so that a cleansing fluid or flushing fluid can be pumped through the vehicle engine in one conduit and out of the vehicle engine with foreign particles in the other conduit.

In some situations the oil pan port is located in an awkward location. This makes drainage of the port difficult, and often results in infrequent drainage of lubricant from the internal combustion engine.

Oil filter ports leading to the oil filter adapter of the engine differ in both size and construction from engine to engine. In some cases, projections extend from the oil filter adapter out of the oil filter port in order to enable mounting of the filter.

Often the structure and location of the oil filter port is of a nature that connecting the adapter with the oil filter port is also awkward. In some internal combustion engines, the location of the oil filter and its construction makes it difficult to attach an adapter to the oil filter opening.

There is a need to provide an adapter system for use with an internal combustion engine flushing apparatus and which enables connection of a flushing apparatus to a drain port and filter port of internal combustion engines, particularly heavy duty engines located in awkward places.

There is also a need to provide for efficiently connecting the flushing fluid conduit from an internal engine flushing apparatus to the drain plug port and the oil filter port of an internal combustion engine, particularly large industrial type engines.

SUMMARY

The invention seeks to fulfill the above needs.

The invention relates to an adapter system for use with an internal combustion engine flushing apparatus which permits connection to ports in the crank case and oil filter of the engine.

The flushing apparatus includes a first liquid conduit for delivery of a flushing liquid from the flushing apparatus to the engine. The flushing apparatus also includes a second conduit for return of the flushing liquid from the engine back to the flushing apparatus.

The adapter system is highly effective for use in heavy duty industrial, marine and trucking internal combustion engines and generally automotive vehicle internal combustion engines.

The adapter system generally comprises an oil pan adapter sized to fit within the drain plug port of the oil pan of the internal combustion engine. Means is associated with the adapter to enable the adapter to fit within the drain plug port.

An oil filter adapter is comprised of a plurality of adapter pieces. These adapter pieces are selectively respectively usable at the drain port and oil filter port leading to the lubrication system of the internal combustion engine.

According to the invention the oil drain adapter is for sealing location in the oil drain port. There is an aperture through an elbow element with an inlet and an outlet.

In one preferred form of the invention there are radial finger formations adjacent to the elbow inlet, and the fingers provided to engage a connector. The connector has radial key elements for engaging with the radial fingers in a sealing relationship. The connector also includes an inlet and an outlet. The outlet to the connector has external threads for engaging the drain port. The connector and elbow element form a sealing engagement when the fingers and key elements are effectively engaged and the fingers engage in a circumferential groove in the connector. The connector is threaded into the drain port, and then the elbow element is swiveled into a locked engagement with the connector. A sealing ring is located between the interface of the connector and the elbow element.

The radial fingers are projecting elements which are radially disposed relative to the axis through the inlet limb of the elbow element and to the connector. Preferably the radial fingers are two oppositely directed radial elements. The key elements in the connecter are radial slots. The radial fingers and radial slots interengage in a swivel relationship to facilitate selective removal or locking connection of the elbow element and connector. In a circumferentially turned position, the radial fingers lock in a circumferentially directed groove adjacent to the radial slots. In this locking circumferential position the fingers are radially offset relative to the slots.

There is an elongated hose means for connection with the outlet of the elbow element. Fluid can flow from the interior of the engine block through the connector, the elbow and the hose. The free end of the hose can be selectively closed thereby to close the pathway against fluid flow when necessary, for instance, when the engine is operating.

The connector abuts an underside of the perimeter about the oil drain port in a flush relationship, and the elbow element is located flush with the connector. In this arrangement a slim depth is needed below the oil pan port for affixing the oil drain port adapter in position. A direct fluid flow is obtainable through the unobstructed and interconnected bore constituted by the interconnected connector and elbow elements.

In another preferred form of the invention for an oil pan port there is provided the interconnected connector and elbow elements related in sealing engagement. The connector has internal threads for connection with external threads associated with the inlet end of the elbow element. The threads are preferably tapered thereby to provide a self-sealing engagement. Outside side faces of the connector are provided with faces for permitting wrenching of the connector into engagement in the oil pan port, and wrenching engagement of the elbow element with the connector. The elbow element is preferably multicomponent and one of the components are relatively rotatable about at least the axes through at least one of the arms of the elbow element.

In the embodiment with the multicomponent swivelable elbow there is provided means to secure the hose relative to and preferably adjacent to, the engine. Anchor means facilitates affixing the hose relatively adjacent to the engine. Preferably the hose includes a quick release fitting for connection with the elbow. There is also a quick action fitting at the free end of the hose.

The hose has an elbow shape so that the free end of the hose points upwardly. The free end of the hose includes the quick action fitting for connection with a fitting at the end of a hose of an engine cleaning unit. The hose is a braided metallic element and the end of the hose extends above the oil level in the oil pan and extends and points upwardly. The connector, elbow and hose with quick action fitting are intended for permanent location connected to the oil drain port.

The oil filter adapter comprises a plurality of components. A first component is a cap for disposition over the oil filter port. Means is associated with this cap for connection to a fitting on an end of a conduit from the flushing apparatus. The cap is also provided with a second component, namely the threaded elongated post which projects into the oil filter port.

The oil filter adapter includes an elongated post for connection on one end of a cap of the adapter. The other end of the post is connected with the oil filter opening of an engine block. The connection of the post to the oil filter opening is selectively effected either with a threaded screw connection or a friction engaging connection. The elongated post threadingly engages with the cap at the end remote from the oil filter opening on the engine block.

The oil filter adapter associated with the engine includes a ring. The cap is sized for connection to the ring. There is a sealing connection between the cap and the ring, and the post is located in the ring.

The invention is further described with reference to the accompanying drawings.

DRAWINGS

FIG. 3 is a sectional side view showing a connector and a portion of the elbow element of the adapter of FIG. 2, the connector and elbow element being separated.

FIG. 4 is a side view of a second embodiment of an oil drain port adapter showing a connector and an elbow element of the adapter in a port.

FIG. 5 is a top view of the elbow element of FIG. 4 showing the radial fingers.

FIG. 6 is a sectional side view through the connector of FIG. 4.

DESCRIPTION

Engine

Figure 1:
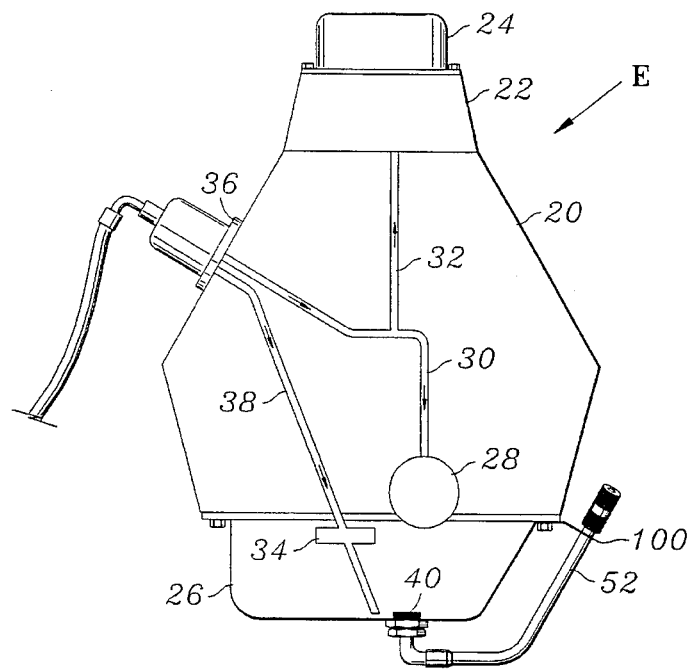
FIG. 1 is a schematic side elevation view of a portion of an internal combustion engine showing elements of the invented adapter system.

In FIG. 1, "E" designates a portion of an internal combustion engine which is only schematically illustrated. The engine E includes an engine block 20 having a cylinder head 22 and a valve cover 24. An oil pan 26 is secured to the lower end of the engine block 20.

The operating components of the internal combustion engine are neither illustrated nor described in detail since they are well known and of a conventional arrangement. A crank shaft 28 is schematically illustrated within the engine block 20 and receives oil from an oil passage 30. In like manner, the valves and other components within the engine block and particularly the cam shaft and lifter arrangement receive lubrication oil through a second oil passageway 32.

Located within the oil pan 26 is an oil pump 34 which is in fluid communication with an oil filter port 36 through a duct 38. In normal operation, a conventional oil filter is located at this oil filter port and receives the lubricating oil of the engine for cleaning same.

The oil pan 26 is provided with a drain plug port 40. In this case, a conventional drain plug (not shown) would normally be threadedly secured within the drain plug port 40 and removed therefrom when it is desired to drain the oil from the crank case and particularly the oil pan of the internal combustion engine.

Flushing Apparatus

A flushing apparatus is conventional, and it is neither illustrated nor described in any detail. Reference can be made to U.S. Pat. No. 3,489,245 dated Jan. 13, 1970 to E. R. Broadwell for "Apparatus for Flushing Internal Combustion Engines".

The flushing apparatus usually includes a pumping mechanism as well as one conduit for introducing a flushing liquid into the internal combustion engine and a second conduit for removing the flushing liquid from the internal combustion engine. The one conduit leads to the oil filter adapter of the engine E through the oil filter port 36 in the engine block 20. The other conduit leads to the crank case and particularly, the oil pan through the oil pump drain plug port 40. More preferably, in these commercial internal combustion engine flushing apparatus, the flushing fluid is introduced at the oil filter port leading to the oil filter adapter in the engine block and the flushing fluid is removed from the conduit connected to the drain plug port 40 in the oil pan 26 of the engine E.

Oil Pan Adapter for Permanent Location in Drain Port

The oil pan adapter system includes a first adapter 50 which is more fully illustrated in FIGS. 2–5. This adapter 50 is connected to an end of a flushing liquid conduit 52 forming part of an internal combustion engine flushing apparatus.

Figure 2:
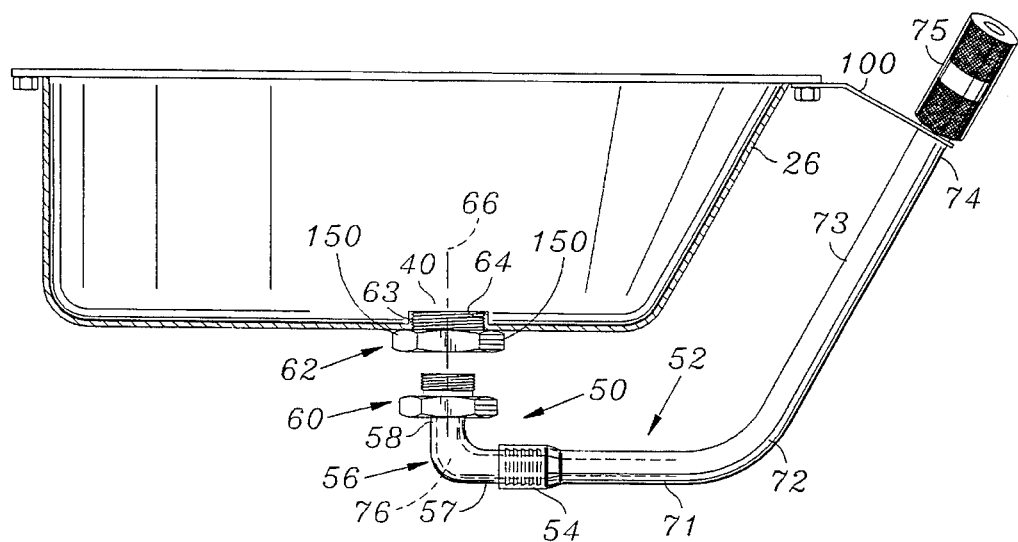
FIG. 2 is a side elevational view showing a first embodiment of an adapter for connection to a drain plug port in an oil pan of an internal combustion engine, the outlet hose being anchored adjacent to the oil pan.

The adapter 50 is connected to the conduit 52 for connection to a hose of the flushing apparatus through barbed circumferential elements 54 in the manner illustrated in FIG. 2. The elements 54 are formed about the outlet end of an elbow element 56.

The elbow element has two limbs 57 and 58 extending at right angles relative to each other.

Limb 57 with barbs are connected to the conduit 52 by a force fit, the conduit 52 being expanded to fit over the barbs 54. In this manner the conduit 52 cannot be easily removed from the elbow element 56. An effective seal is obtained between elbow element 56 and the conduit 52.

The connector 62 provides multiple flat faces 150 to facilitate the wrenching of the connector 62 into position in the drain port 40. The outside surface above the faces 150 includes a threaded portion 63 for engagement with internally threaded 64 of the port 40. By having the threads 64 be a tapered configuration an effective self seal is obtained.

A component 160 of a multicomponent construction constituting an elbow element 56 is arranged for threading engagement with internal threads 161 of the connector 62, These threads are also tapered to provide for a self seal, The outside face 162 of the element 160 are flat to facilitate a wrenching engagement of the components 160 and 62, The elbow element 56 has a second component 163 which forms the 90° bend of the elbow element 56, The component 163 is fed through the bore 164 of the component 160 to effect assembly of the elbow element 56, A sealing ring 165 is located between a circumferential lip 166 at the inlet end of element 163 and a shoulder 167 formed in the bore 164 of element 160, This provides for sealing, A further sleeve 168 fits in the bore 164 to ensure positive and sealing placement of the components when the component 160 is engaged with connector 62.

The free end 169, namely the outlet end of the elbow element 56 has circumferential rings 176 forming barbs 54. This facilitates the connector with the conduit 52. Effective swiveling can be obtained about 66 between the component 160 and the element 163 of the elbow element 56. A swivel elbow element is thereby obtained.

The conduit 52 is formed of a braided metallic wrapped element and is shaped in an elbow-type fashion, A first limb 71 is horizontally and substantially parallel to the outlet limb 57 of the elbow, There is then a bend 72 which turns the conduit upwardly about 60° to form a second limb 73 which is directed substantially upwardly, The free end of 74 of the conduit 52 is attached to a quick action fitting 75. The fitting 75 is for connection with a coupling at the end of the hose from cleaning apparatus.

The construction of the connector unit 62, elbow 56, hose 52 and fitting 75 is a relatively high quality and is rugged.

Clips or anchors 100 may be provided to secure this adapter and conduit in a permanent location with the drain port 40. Normally the quick action fitting 75 is closed when not attached to a hose from the cleaning apparatus. The approximate length of the hose can be between 2½ to 3 feet. The swivel facility provided in the elbow 56 can permit for the adapter mechanism to rotate about the axis 66 as necessary.

For heavy duty industrial internal combustion engines, such as marine engines, trucks and the like, where it is awkward to reach the oil drain 40, this adapter is permanently located in position. With the quick action fitting 75 closed, oil cannot escape from the oil pan.

Appropriate seals are provided between the connector unit 62, the elbow 56 and the quick action fitting 75 as necessary. Different clip mechanisms 100 would secure the hose 52 relative to the engine in a manner that it cannot be dislodged or moved under motion, for instance, of a vehicle on the road or a boat in water. The adapter unit is thus stable in location during the operation of the internal combustion engine.

Slim Line Drain Port Adapter

Inlet limb 58 includes a free end 60 which has two radially directed fingers 61 for connection with a connector unit 62. The circumferential wall 180 about the bore and from which the fingers 61 radiate extends to the top 60 of the elbow element 56.

The connector unit 62 has an externally threaded portion 63 for engagement in the internally threaded oil drain port 40. The threads for the oil drain port are indicated by numeral 64. The connector 62 has two radially directed keys in the form of slots 65 which accommodate the radial fingers 61 as required.

The fingers 61 are inserted in the slots 65 and the connector 62 and elbow 56 are urged towards each other. The elbow 56 and connector unit 62 can then be relatively turned or swiveled about the axis 66. The fingers 61 engage in the circumference groove 67 which is located in the body of the connector 62 between the faces 170 and 172 of the connector unit 62 and inset from slots 65. In this manner the elbow 56 effectively is locked with the connector unit 62. This also acts as a quick release mechanism for separating the connector unit 62 from the elbow 56 under swivel action as may be necessary.

The outside of the connector unit 62 is provided with a knurled surface 70 which facilitates inserting the connector unit 62 into the oil drain port 40. The connector is anchored in the port 40 by screwing the threaded section 63 into engagement with threads 64. The elbow element 56 is then attached to the connector unit 62 and turned about the axis 66 and thereby locked with the connector unit 62.

A suitable bore 76 is provided in the elbow 56 and connector unit 62 for lubricant or cleaning fluid to pass through the coupling 56 as required.

The connector element 62 provides a face 170 which is located flush with the base of the oil pan. Also by having the length of the threaded portion relatively short, a slim profile is obtained, and the connector is located in a close relationship in the pan port 40. With a short threaded portion it is easy to locate the connector 62 in place.

The elbow element 56 has a face 171 which engages in a flush relationship with a face 172 on the back of the connector 62. A sealing ring 173 is housed in a recess in the face 171 to ensure a sealing assembly of the elbow 56 and connector 62. The flush relationship of faces 171 and 172 ensures that the overall depth of the adapter between the end 174 and end 175 is narrow. This facilitates locating the adapter in position.

The overall depth of the connector between the end 174 and the face 172 is approximately about equal to the overall depth of the elbow between the end 60 and the face 175.

Oil can be drained from the oil pan 26 through the hose 52 and out through the cleaning apparatus. (FIG. #1) In other situations when the cleaning apparatus is operated, cleaning fluid passes through the connector unit 62, elbow 56, hose 52, quick action valve fitting 75 and into the hose of the cleaning apparatus for recycling and cleaning. The quick action fitting 75 is a conventional fitting using a sliding action operable with ball bearings to facilitate an opened and/or closed condition. When connected slidingly with a bore the quick action fitting 75 is open for fluid passage. When disconnected, the sliding action with the ball bearing effectively closes the fitting 75.

Oil Filter Adapter

The invention also provides an oil filter adapter. This is usually referred to as a lubrication system adapter, and is more fully illustrated in FIGS. 7 to 10.

Figure 7:
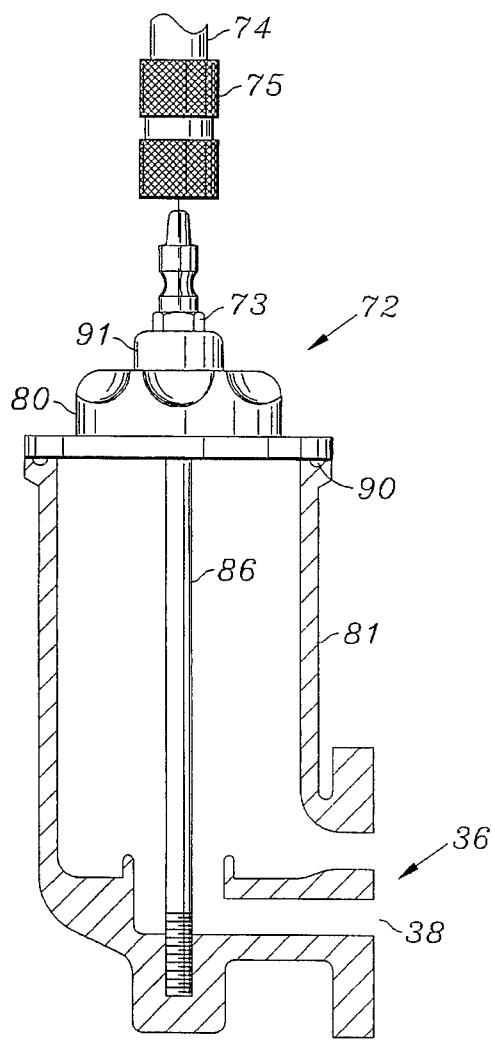
FIG. 7 is a vertical crossectional view showing several connected pieces of an oil filter adapter for connection to the oil filter port.
Figure 8:
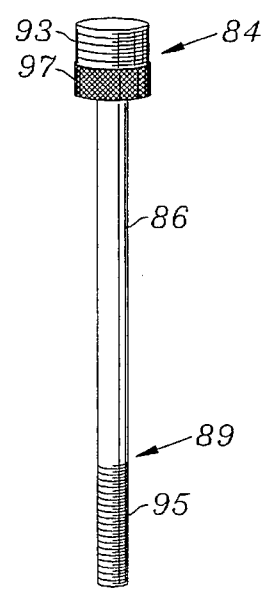
FIG. 8 is a perspective view showing a post of the adapter forming part of an oil filter adapter.

In FIG. 7, there is illustrated an oil filter adapter arrangement 72 which is provided for connection to the oil filter port 36 of the internal combustion engine E. In this case, the components of the adapter set 72 are connected through a coupling 73 to a flushing fluid conduit or hose 74. Generally, although not necessarily, this conduit 74 is designed to deliver the flushing fluid to the lubricating system of the internal combustion engine and the conduit 52 is designed to return the flushing fluid back to the flushing apparatus.

Two oil filter adapter components form part of the adapter. There is provided an adapter cap 80 which is sized to be secured to an outer cylindrical ring 81 formed on part of the engine block E at the oil filter port of the lubricating system forming part of the internal combustion engine.

Figure 9:
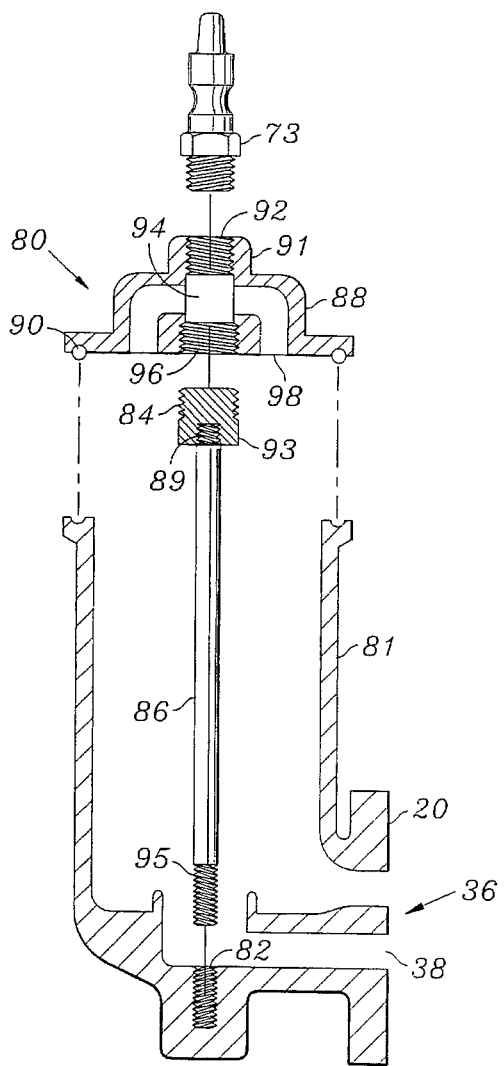
FIG. 9 is an exploded side elevational view, partially in section and showing an oil filter adapter for use at the oil filter port of an internal combustion engine.
Figure 10:
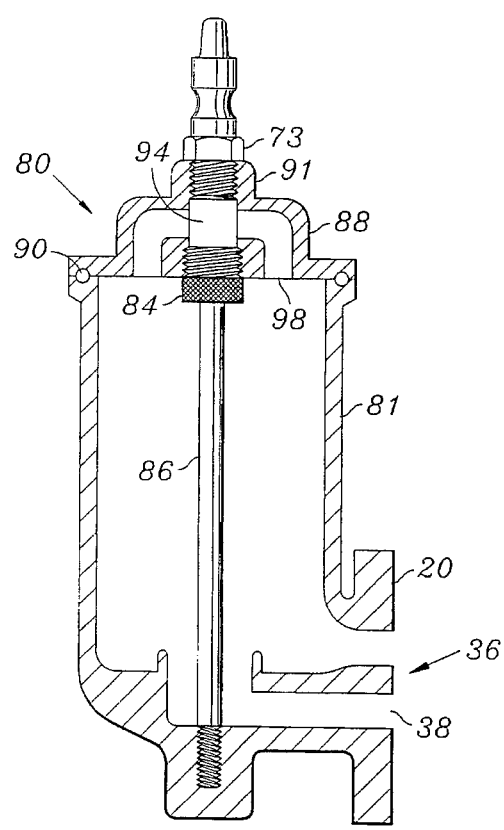
FIG. 10 is a fragmentary side elevational view showing connection of one adapter piece of FIG. 8 to an oil filter port of an internal combustion engine.
Figure 11:
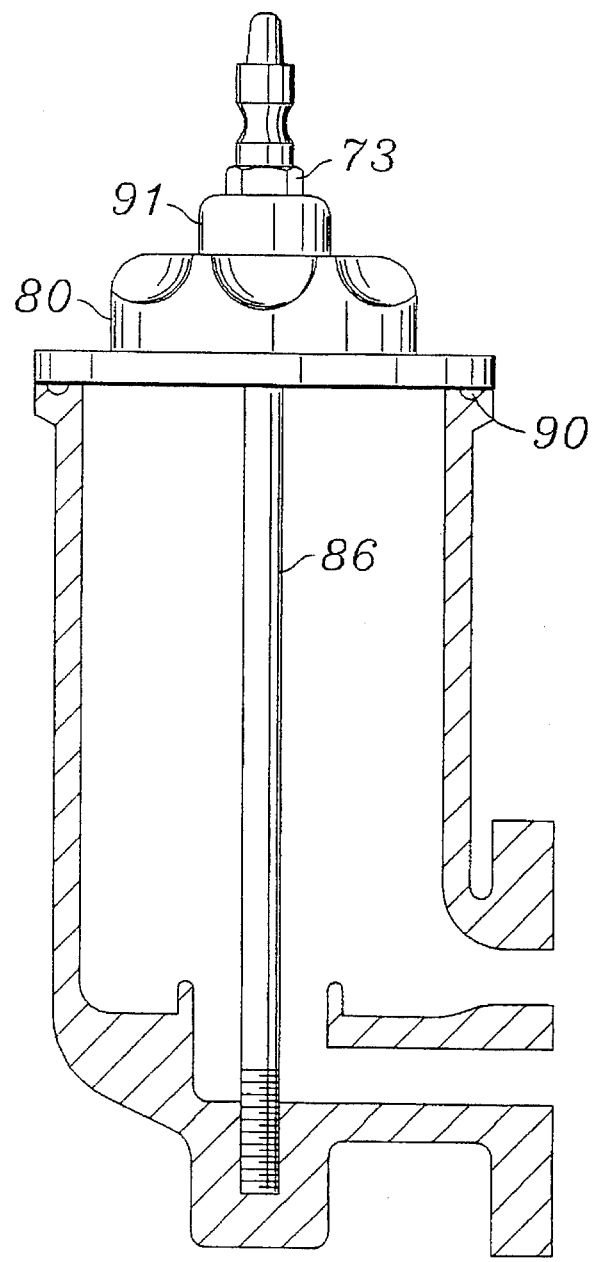
FIG. 11 is a vertical cross-sectional view of an oil filters adapter.

FIG. 9 illustrates an internally threaded portion 82 extending through the port 36 on the internal combustion engine block 20 and which is threaded in order to receive a stem of conventional oil filter. The portion 82 leads to the oil filter adapter of the engine in a conventional manner. Other means for mounting the oil filter to the engine block 20 may be provided and that the oil filter adapter system of the invention will accommodate these other mounting systems.

When the conventional oil filter is attached to the engine block 20, it is usually provided with a projected stem having an externally threaded section (not shown) for connection into the threaded portion 82. In this case, the oil filter adapter cap 80 is provided with an externally threaded post 86, for threaded connection with the threads on the portion 82 of the engine block.

The adapter cap 80 is provided with an outer cap 88 provided about its periphery with an annularly extending rubber seal 90 sized to engage the cylindrical ring 81 of the engine block 20 when the adapter cap 80 is threadedly secured on the portion 82 through post 86. In this way, a fluid type seal is created with the engine block between a conduit such as the conduit 74, and the port 36 leading to the oil filter adapter of the internal combustion engine.

The cap 80 is provided with an outwardly projecting hub 91 and which is provided with an internally threaded aperture 92 for receiving a threaded nut of a coupling 73. The internally threaded aperture 92 leads to a passageway 94 in the hub 90 and the cap 80 and which in turn, leads to another internally threaded section 96 in the cap 80. The threaded section 96 is provided for threaded securement to the threaded section 84 on the post 86 so that the conduit 74 communicates with a portion 82 in the engine block E.

In some cases, the central internal threaded section 96 is blocked by another oil filter adapter component. Therefore fluid communication between a conduit connected at the internally threaded opening 92 and the portion 82 of the engine occurs through small openings 98 in the cap 80 (as best shown in FIG. 9) and which will also lead to the port 36 of the internal combustion engine.

The elongated post 86 has a diametrically reduced threaded end 89. There is an externally threaded section 93 which is sized to engage the internally threaded section of the adapter cap 80 to be retentively held thereby. The post 86 is provided with an externally threaded section 95 at its opposite end for securement to the internally threaded portion 82 in the oil filter port of the engine block.

Many more examples of the invention exist each differing from this in matters of detail only. The invention is to be determined solely by the following claims.

We claim:

1. An adapter system for use with an internal combustion engine flushing apparatus which permits connection to the crank case and oil filter port of an internal combustion engine for introducing fluid through the oil filter port and draining of said fluid through the crank case, said adapter system comprising:

a) an oil pan adapter sized to fit within the drain plug port of an oil pan of the engine to create a liquid tight seal with the port, and a connecting conduit connected with the adapter, the conduit being directed from the drain plug port in an overall upward direction and intended to be located relatively permanently adjacent the engine, the adapter and conduit having communicating bores for selectively passing fluid from the engine when the bore is open; and b) an oil filter adapter, such oil filter adapter fitting with the oil filter port of the internal combustion engine and creating a liquid tight seal with the port, and selectively permitting communication of fluid through the adapter and the flushing apparatus, wherein the oil filter adapter includes a threaded elongated non-hollow post for engagement with the engine block at the oil filter port, the post being threaded at both ends, the one end engaging with the engine block and the opposite end engaging a cap associated with the oil filter adapter, and a cylindrical elongated ring surrounding the post.

2. The adapter system of claim 1 wherein the oil pan adapter includes a connector for threaded engagement in the drain plug port, and an elbow element engageable at one end of the elbow under rotatable locking action with the connector, and engageable at another end of the elbow with the conduit.

3. The adapter system of claim 2 wherein the conduit includes a free end removed from the drain port, the free end being for connection with the engine flushing apparatus.

4. The adapter system of claim 2 wherein one end of the conduit is connectible with the elbow element and the other end of the conduit is connectible with the engine flushing apparatus.

5. An adapter for use with an internal combustion engine flushing apparatus permitting connection of a conduit from the apparatus at the oil filter port leading to the oil filter adapter of the internal combustion engine, the adapter comprising:

a) a cap for disposition over the oil filter port;
b) means associated with said cap for connection to a fitting on an end of the conduit from the flushing apparatus;
c) seal means on the cap for engaging a cylindrical ring section surrounding the oil filter port and retaining the cap over the port on the engine with a liquid tight seal;
d) the cap also having a threaded section for connection to threaded post directed to an oil filter port, and
e) an elongated non-hollow threaded post between the cap and the oil filter port, and a circumferential ring being about the post, the ring being associated with the oil filter for the engine.

6. The adapter of claim 5 wherein the post is threaded at opposite ends, one end being for threaded connection with the cap and the other end for threaded connection with the engine block.

7. An adapter system for use with an internal combustion engine flushing apparatus which permits connection to the crank case of the internal combustion engine for draining fluid through the crank case, said adapter system comprising an oil pan adapter sized to fit within the drain plug port of an oil pan of the engine to create a liquid tight seal with the port and an elongated conduit connected with the adapter, the conduit being in fluid communication with the adapter and being directed from the drain plug port and being intended to be located relatively permanently adjacent to the engine, and wherein the oil pan adapter includes a connector for threaded engagement in the drain plug port, and an elbow element engageable at one end of the elbow with the connector under rotatable action with the connector, and engageable at another end of the elbow element with the conduit, the connector being for substantially flush location with the port, and the overall depth of the connector and depth of the elbow being about equal.

8. The adapter system of claim 7 wherein the conduit includes a free end removed from the drain port, the free end being for connection with an engine flushing apparatus.

9. The adapter system of claim 7 wherein one end of the conduit is connectible with the elbow and the other end of the conduit is connectible with an engine flushing apparatus.

10. The adapter system as claimed in claim 7 wherein the conduit includes a bend wherein one end of the conduit is directed from the drain plug port and the opposite the end of the conduit is directed in an upward direction.

11. The adapter system as claimed in claim 7 wherein the conduit at an end removed from the drain plug port includes a fitting normally sealed when an engine is operable, and which fitting is operable when connected with a flushing apparatus.

12. The adapter as claimed in claim 7 wherein the elbow element is formed of multiple components, and wherein a sealing engagement is established between the multiple components and the connector when the elbow is effectively connected with the connector.

13. An adapter system as claimed in claim 7 wherein the connector includes radial key elements for engagement with radially outwardly directed fingers, the fingers being formed at one end of an elbow.

14. An adapter system for use with an internal combustion engine flushing apparatus which permits connection to the crank case of the internal combustion engine for draining fluid through the crank case, said adapter system comprising an oil pan connector sized to fit within the drain plug port of an oil pan of the engine to create a liquid tight seal with the port and an elongated conduit connected with the connector, the conduit being in fluid communication with the connector and being directed from the drain plug port, the connector including a threaded portion at one end, the threaded portion being for threaded engagement with the threads on a drain plug port, the connector including radial key elements for engagement with radially outwardly directed fingers, the fingers being formed at one end of an elbow, the other end of the elbow being for connection with the conduit, the connector being for location in flush relationship about the port, and the overall depth of the connector and depth of the elbow being about equal.

15. An adapter system as claimed in claim 14 wherein in one circumferential position the fingers engage the radial key elements so as to be selectively removable from the connector, and in another circumferential position, the elbow is affixed with the connector, the elbow and the connector being rotatable about a longitudinal axis through the connector, and wherein the elbow includes a wall defining a bore through the elbow, the wall extends to the end of the bore, and the radial fingers extend from the wall.

16. An adapter system for use with an internal combustion engine flushing apparatus which permits connection to the crank case of the internal combustion engine for draining fluid through the crank case, said adapter system comprising an oil pan adapter sized to fit within the drain plug port of an oil pan of the engine to create a liquid tight seal with the port and an elongated conduit connected with the adapter, the conduit being in fluid communication with the adapter and being directed from the drain plug port and being intended to be located relatively permanently adjacent to the engine, and wherein the oil pan adapter includes a connector for threaded engagement in the drain plug port, and an elbow element engageable at one end of the elbow with the connector under rotatable action with the connector, and engageable at another end of the elbow element with the conduit, and the connector including radial key elements for engagement with radially outwardly directed fingers, the fingers being formed at one end of an elbow.

\* \* \* \* \*